(12) United States Patent
Vassiliou et al.

(10) Patent No.: US 7,818,028 B2
(45) Date of Patent: *Oct. 19, 2010

(54) MODIFIED DUAL BAND DIRECT CONVERSION ARCHITECTURE THAT ALLOWS EXTENSIVE DIGITAL CALIBRATION

(75) Inventors: Iason Vassiliou, Berkeley, CA (US);
Nikos Haralabidis, Athens (GR);
Theodore Georgantas, Athens (GR);
Akira Yamanaka, Union City, CA (US);
Konstantinos Vavelidis, Athens (GR);
Sofoklis Plevridis, Athens (GR)

(73) Assignee: Broadcom Corp.

( * ) Notice: Subject to any disclaimer, the term of this patent is extended or adjusted under 35 U.S.C. 154(b) by 0 days.

This patent is subject to a terminal disclaimer.

(21) Appl. No.: 12/329,889

(22) Filed: Dec. 8, 2008

(65) Prior Publication Data
US 2009/0088086 A1 Apr. 2, 2009

Related U.S. Application Data

(63) Continuation of application No. 11/103,329, filed on Apr. 11, 2005, now Pat. No. 7,463,864.

(60) Provisional application No. 60/560,950, filed on Apr. 9, 2004.

(51) Int. Cl.
*H04B 1/10* (2006.01)
*H04B 1/28* (2006.01)
*H04M 1/00* (2006.01)

(52) U.S. Cl. ............... 455/550.1; 455/307; 455/333; 455/552.1

(58) Field of Classification Search ............ 455/73, 455/78, 80, 550.1, 553.1, 307, 333, 552.1
See application file for complete search history.

(56) References Cited

U.S. PATENT DOCUMENTS

| | | | |
|---|---|---|---|
| 5,381,108 A | 1/1995 | Whitmarsh et al. | |
| 6,381,286 B1 | 4/2002 | Wilkinson et al. | |
| 6,987,954 B2 | 1/2006 | Nielsen | |
| 7,187,916 B2 | 3/2007 | Mo et al. | |
| 7,206,557 B2 | 4/2007 | Aytur et al. | |
| 7,463,864 B2 * | 12/2008 | Vassiliou et al. | 455/73 |
| 2003/0193923 A1 | 10/2003 | Abdelgany et al. | |
| 2003/0207668 A1 | 11/2003 | McFarland et al. | |
| 2004/0038649 A1 | 2/2004 | Lin et al. | |
| 2004/0048584 A1 * | 3/2004 | Vaidyanathan et al. | 455/103 |
| 2004/0121753 A1 * | 6/2004 | Sugar et al. | 455/333 |
| 2004/0162023 A1 * | 8/2004 | Cho | 455/41.1 |
| 2004/0204036 A1 | 10/2004 | Yang | |
| 2005/0020298 A1 | 1/2005 | Masumoto et al. | |
| 2005/0048928 A1 * | 3/2005 | Jeon et al. | 455/78 |

* cited by examiner

*Primary Examiner*—Simon D Nguyen
(74) *Attorney, Agent, or Firm*—McAndrews, Held & Malloy, Ltd.

(57) ABSTRACT

A communication device may include one or more circuits in an integrated transmitter and receiver that includes a transmit path and a receive path. The transmit path may include an I processing baseband transmit path and a Q processing baseband transmit path. The receive path may include an I processing baseband receive path and a Q processing baseband receive path. The one or more circuits may enable sharing a first common filter by the I processing baseband transmit path and the I processing baseband receive path. The one or more circuits may also enable sharing a second common filter by the Q processing baseband transmit path and the Q processing baseband receive path. The first common filter and the second common filter are independently programmable to adjust a phase and/or a gain of the said first common filter, and/or a phase and/or a gain of the second common filter.

36 Claims, 4 Drawing Sheets

MODIFIED DUAL BAND DIRECT CONVERSION ARCHITECTURE THAT ALLOWS EXTENSIVE DIGITAL CALIBRATION

CROSS-REFERENCE TO RELATED APPLICATION(S)

This application is a continuation of U.S. application Ser. No. 11/103,329 filed Apr. 11, 2005, which in turn makes reference to, claims priority to and claims the benefit of U.S. Provisional Patent Application Ser. No. 60/560,950 filed on Apr. 9, 2004.

FIELD OF THE INVENTION

The present invention relates to transceivers, and more particularly to integrated direct-conversion transceivers that enable the use of digital calibration in order to correct for nonidealities in the system and achieve performance adequate to support high bit rate modulation schemes.

BACKGROUND OF THE INVENTION

One increasingly popular application for wireless systems are wireless local area networks (WLANs) of computer systems. Prominent in the field of home and business, wireless computer networks include the wireless standards known as 802.11. The first standard to be available in commercial products was 802.11b. However, increasing demand for higher capacity in the growing wireless LAN market has led to the introduction of a new generation of WLAN standards using more spectrally efficient modulation techniques, including the IEEE 802.11a standard. The 802.11a standard operates in the 5 GHz unlicensed national information infrastructure (UNII) band (5.15-5.35 GHz, 5.725-5.825 GHz) and is based on orthogonal frequency division multiplexing (OFDM). It supports data rates from 6 Mb/s to 54 Mb/s compared to 1 Mb/s to 11 Mb/s offered by 802.11b. The 802.11a operation around 5 GHz offers the additional advantage of less interference compared to the 2.4 GHz ISM band, where in addition to 802.11b, other band users include microwave ovens, cordless phones, Bluetooth systems, and vintage 802.11 systems. The 802.11g standard also emerged as an alternative to 802.11a in the 2.4 GHz band.

The advantages of 802.11a come at a cost, however, as OFDM-based systems pose significant implementation challenges requiring low in-band phase noise, high linearity, accurate quadrature matching, closely matched frequency response between the I and Q signal paths, and a large dynamic range. "I" and "Q" are terms referring to "in-phase" and "quadrature," respectively. Ideally, the difference between I and Q signal paths in a transceiver is 90 degrees and the gain is 0 dB. I/Q mismatch refers to the difference in phase and gain between these paths. For example, in order to meet the transmitter error vector magnitude (EVM) specification for the 54 Mb/s mode with a 3 dB implementation margin, system simulation shows that an I/Q mismatch of 1.5°/0.2 dB, an integrated phase noise error of $1°_{rms}$ and operation at 8 dB backoff from the transmitter 1 dB compression point are required.

In addition to tight performance constraints, pricing pressures require that wireless systems be low-cost and highly integrated implementations. To address these needs, the continuous trend towards low-cost integration of wireless systems has driven the introduction of innovative single-chip architectures in CMOS technologies as inexpensive alternatives to the traditional superheterodyne implementations operating at frequencies up to 5 GHz. Many of these single chip architectures are homodyne or direct conversion architectures, which have much fewer components than superheterodyne implementations. For example, in superheterodyne systems, the intermediate frequency (IF) must be high, so that the image is located far from the wanted signal in the frequency spectrum. However, since the IF frequency is high, the filtering of the desired channel (at IF) must also be done at the high frequency. It is difficult or impossible to implement such a filter as an integrated system, so external components are unavoidable. Direct conversion systems do not need such external components.

However, such highly-integrated direct-conversion single-chip architectures suffer from well-known shortcomings that may limit their applicability. These are problems that are also shared by other integrated architectures such as low-IF or wideband-IF, but which can be further aggravated by using CMOS technology.

For example, on the receiver side, the most common problem is the presence of DC offsets, both static and time-varying. In the 802.11a/g standards, even though a down-converted I/Q signal occupies bandwidth from 150 kHz to 8.3 MHz, the maximum 40 ppm frequency mismatch allowed between transmitter and receiver may shift the signal around DC, thus prohibiting AC coupling without using complex analog frequency correction techniques.

Static DC offset is the result of component mismatches in the signal path and local oscillator (LO) leakage at the inputs of the mixer and the low-noise amplifier (LNA) due to finite on-chip isolation. The leakage signal after mixing with the LO produces a DC component at the baseband input, which depends on the frequency and power of the LO signal. Since static DC offset may be large enough to saturate the baseband receive chain, it needs to be cancelled in the analog domain.

Time-varying DC offsets, in direct conversion receivers, can be the result of self-mixing due to leakage of single-tone (CW) or frequency modulated (FM) interference to the LO port. Similarly, second order distortion applied to CW or FM interference results in DC offset, which varies with the frequency and the power level of the received signal. Since strong interference is not usually present in the 802.11a operating bands, the dominant mechanism causing time-varying DC offsets is self-mixing of the LO signal leaking to the antenna and reflected back from the environment. At the 5 GHz carrier frequency, due to high attenuation and absorbency of reflected signals, such time-varying DC offsets are small compared to the static DC offsets and the overall dynamic range of the receiver (e.g., in the order of 10-50 mV for a 2Vp-p signal), thus it is well known that the time-varying offsets can be tracked and removed by digital signal processing (DSP) after analog-to-digital conversion.

Direct down/up-conversion from/to 5 or 2.4 GHz requires quadrature LO generation at the RF carrier frequency which may result in large I/Q mismatches (including gain and phase mismatches). Other significant problems include sensitivity to flicker noise and pulling of the voltage-controlled oscillator (VCO) by the external or on-chip power amplifier (PA). In addition to these architecture-related non-idealities, higher order QAM-OFDM modulation requires tightly matched baseband I/Q filters on both transmit and receive side to avoid degradation of the overall EVM.

Some of the aforementioned problems and requirements can be mitigated and addressed by careful circuit design and layout, analog auto-calibration techniques or one-time calibration at production testing. However, such approaches may require several design iterations and can be highly sensitive to process variations, thus degrading yield and increasing overall cost, which may cancel the advantages of using CMOS integrated architectures.

Accordingly, what is needed is a low-cost system and method for implementing a highly-integrated, multi-band, multi-standard capable direct-conversion transceiver, preferably implemented in CMOS to achieve low production cost, with the aforementioned problems eliminated or minimized. The present invention addresses such needs.

SUMMARY OF THE INVENTION

A dual band direct conversion architecture for both the receive (RX) and transmit (TX) path of a communications transceiver that minimizes the transceiver area by sharing common circuits used in both RX and TX paths is disclosed. The transceiver also allows the use of extensive digital calibration in order to achieve performance adequate to support high bit rate modulation schemes.

DETAILED DESCRIPTION

The present invention relates to transceivers, and more particularly to integrated direct conversion transceivers that allow for the use of digital calibration in order to achieve performance adequate to support high bit rate modulation schemes. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

The present invention describes a direct conversion radio transceiver suitable for IEEE 802.11a/b/g applications. It is based on a system architecture that utilizes on-chip feedback paths that enable the companion baseband IC to compensate various transceiver non-idealities through digital calibration. By using a Fractional-N synthesizer, the transceiver achieves very low integrated phase noise performance independent of the reference crystal and channel spacing. The overall area is minimized by sharing common baseband cells for both 5 GHz and 2.4 GHz systems and by employing the same analog baseband filters for both transmit and receive paths, thus resulting in a cost-efficient market solution while still maintaining state-of-the-art performance.

Figure 1:
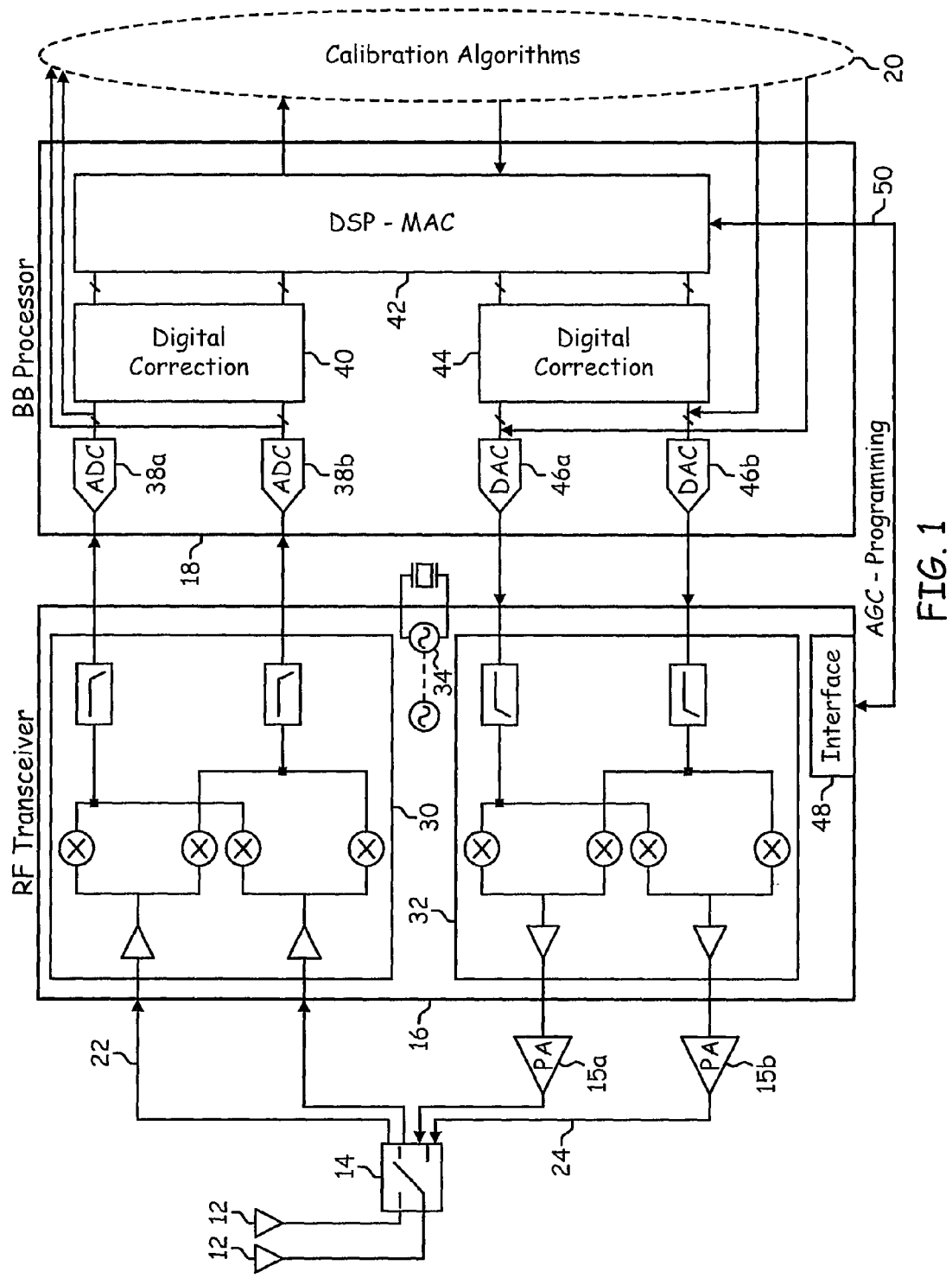
FIG. 1 is a block diagram of an overall system architecture for the present invention.

FIG. 1 is a block diagram of an overall system architecture 10 for the present invention. System 10 includes one or more antennas 12, a transfer switch 14, a radio frequency (RF) transceiver 16, a companion baseband processor 18, and calibration methods 20.

Antennas 12 are used to receive a transmitted signal from the air, and to transmit a signal to this air channel. For example, in a wireless LAN environment, a different computer may be transmitting data via wireless transmission, which is then received by one or more antennas 12. Or, the computer to which the antennas 12 are coupled can transmit a signal via antennas 12, which is received by a different antenna, computer or device. Other types of wireless devices can also use one or more antennas 12 which are also suitable for use with the present invention. A transfer switch 14 can be coupled to the antennas 12 and is used to switch between an input port 22 and an output port 24. The transfer switch 14 can be a double-pole double-throw (DPDT) switch, or a combination of switches or switches and diodes performing the same functionality. Typically, the received signal is filtered by one or more radio frequency (RF) filters (not shown) before being provided at the receiver input 12.

The input 22 and output 24 are connected to RF transceiver 16 of the present invention, which includes a receiver component 30, a transmitter component 32, and a frequency synthesizer 34. The receiver component 30 receives the signals from the antennas 12 and processes the signals to allow the desired data to be retrieved from the signals. Processing includes frequency translation to a low intermediate frequency (IF) or baseband, and filtering of unwanted interference from the useful signal. The transmitter component 32 converts a signal formulated by the baseband processor 18 (or other processor) to a form in which it can be transmitted by the antennas 12. Frequency synthesizer 34 generates the reference frequency (LO) signals needed for modulation and demodulation in the transceiver 16. In one described embodiment, transceiver 16 is provided on a single integrated circuit chip, an integrated solution allowing it to be cheaply manufactured. RF transceiver 16 is described below in greater detail with respect to FIG. 2.

In one application for the present invention, transceiver 16 can be implemented as a direct conversion radio transceiver. This embodiment can implement the radio part of the PHY (physical) layer for an 802.11a/b/g, dual-band (2.4 and 5 GHz or any two RF bands) WLAN system, for example, or other wireless LAN or communication system. For example, CMOS can be used for a single-chip implementation. Many of the problems that typically apply to integrated CMOS or other similar integrated technology in direct conversion high frequency transceiver applications are minimized in the present invention through the use of calibration techniques and overall system design.

Baseband processor 18 is coupled to RF transceiver 16. Processor 18 can be any type of processor, including a microprocessor, application-specific integrated circuit (ASIC), or other type of controller. Processor 18 can be a general purpose processor that performs other tasks and functions for the device in which the system 20 is included in addition to the functions needed for the present invention. For example, processor 18 can be a controller or processor in a wireless network card, or a general microprocessor in a computer that includes a wireless network card using the present invention. Alternatively, processor 18 can be specifically provided for the present invention, and in some embodiments can be included with transceiver 16, e.g. on the same integrated circuit chip. One important feature of some embodiments of the present invention is that the functionality of the processor 18 needed for the present invention can be implemented using free resources of an existing processor, such as a host processor, and has little impact on the computational resources of such a processor.

An important function of the processor 18 for the present invention is the compensation of non-idealities of the transceiver 16 using computing resources of the processor 18 and by calibrating components of the transceiver. The baseband processor 18 receives a down-converted received signal from the receiver component 30 of the transceiver 16, where the signal has been separated into its in-phase (I) and quadrature (Q) forms. The received signal is provided to analog-to-digital converters (ADCs) 38a and 38b, where ADC 38a receives the I signal and ADC 38b receives the Q signal.

Figure 1A:
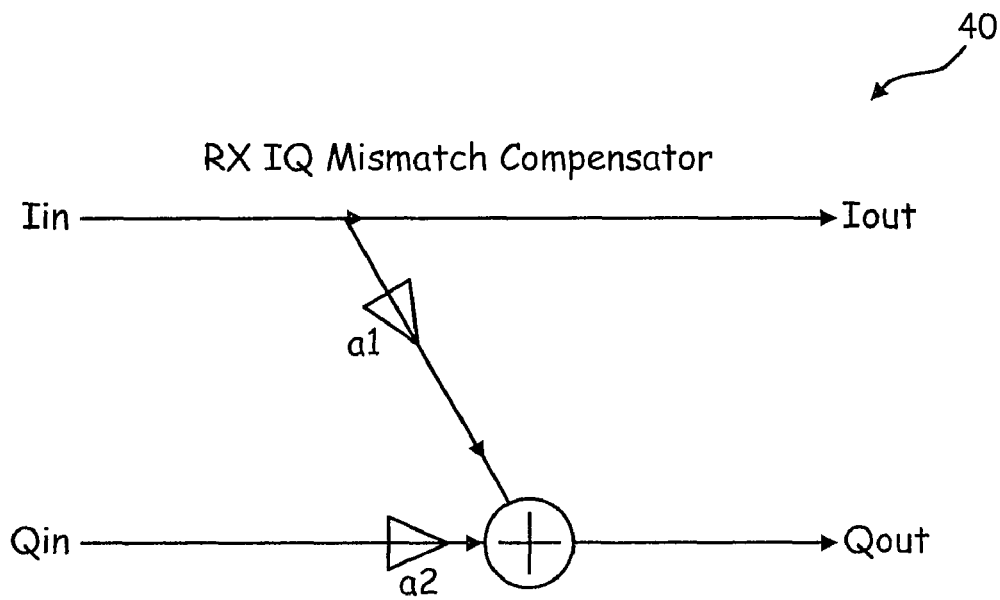
FIG. 1a illustrates a schematic representation of the digital post-distortion correcting function of the correction block.

The digital outputs of the ADCs 38a and 38b are provided to a digital correction block 40, which performs real-time I/Q mismatch correction (post-distortion) by using the coefficients (calibration parameters) computed during an initial calibration cycle. FIG. 1a illustrates a schematic representation of the digital post-distortion correcting function of correction block 40. Block 40 receives an Iin signal and a Qin signal. To compensate for receiver I/Q mismatch, the block 40 multiplies a parameter a1 with the Iin signal and multiplies a parameter a2 with the Qin signal, and adds these two products together to produce the corrected Qout signal. The Iout signal is simply the Iin signal. Calibration methods 20, residing either in the DSP 42, or on the host or other processor (if separate), compute the coefficients a1 and a2 ("calibration parameters") for the correction block 40 during the calibration cycle described with reference to FIG. 8.

The digital correction block 40 provides the I and Q data to a digital signal processor (DSP) 42, which performs the rest of the functionality of the PHY and MAC (media access control) communication layers (e.g., communicating with other processors and/or functions of a host computer or device. This functionality can be implemented entirely within the DSP processor 42, be partitioned between a processor (such as an ASIC) and a general processor, or reside totally in a general (e.g., host) processor. The DSP 42 can be a processor on the processor chip 18, or some other processor used to implement the calibration methods described herein. In receive mode, DSP 42 receives corrected digital data from the digital correction block 40, representing signals received by the transceiver 16, for digital demodulation for recovery of the original bits of information.

Figure 1B:
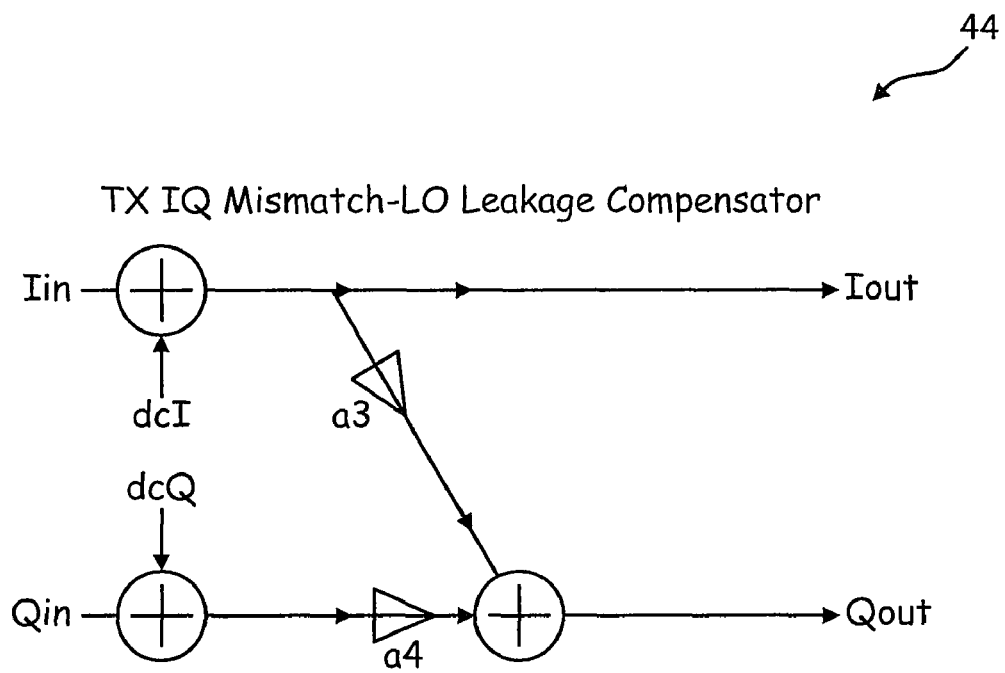
FIG. 1b illustrates a schematic representation of the digital pre-distortion correcting function of the correction block.

In transmit mode, when the DSP 42 has data to be transmitted, the data is corrected in correction block 44, which performs real-time I/Q mismatch correction (pre-distortion) by using the coefficients (calibration parameters) computed during an initial calibration cycle. FIG. 1b illustrates a schematic representation of the digital pre-distortion correcting function of correction block 44. Block 44 receives an Iin signal and a Qin signal. To compensate for LO leakage, the block 44 adds a constant dcI to the Iin signal, and adds a constant dcQ to the Qin signal. To compensate for transmitter I/Q mismatch, the block 44 multiplies the Iin sum (Iin+dcI) by a parameter a3, multiplies the Qin sum (Qin+dcQ) by a parameter a4, and adds these two products together to produce the corrected Qout signal. The Iout signal is the Iin sum (Iin+dcI). Calibration methods 20 compute the coefficients a3, a4, dcI and dcQ (calibration parameters) for the correction block 44 during the calibration cycle.

Correction block 44 sends the I data to digital-to-analog controller (DAC) 46a and sends the Q data to DAC 46b. DACs 46a-b convert the digital data into I and Q analog signals which are provided to the transmitter 32 of transceiver 16. In one embodiment, DACs 46a-b can be dual 10-bit 40 MHz DACs, but may be any suitable type in other embodiments.

DSP 42 also provides programming signals 50 for the RF transceiver 16, which can include (but are not limited to) real time automatic gain control (AGC) signals, and signals for programming the frequency synthesizer 34, programming the correction DC offset for the DC offset correction DACs of the receiver, programming the cutoff for the analog filters, and programming the chip into different states or calibration modes as described below.

In the described embodiment, a digital interface of the transceiver 16 receives these signals which can include, for example, a 7-bit AGC control line and a 3-wire interface for all other programming as well as real-time signals for receiver and transmitter switching. The programming signals 50 allow the processor 18 to control loop-back paths on the transceiver 16 so that the processor can send calibration signals (stimuli) to the transceiver and to receive responsive signals from the transceiver based on the calibration signals, i.e., as if the transceiver has received the calibration signals wirelessly. This enables the measurement of analog imperfections of the transceiver 16 during the calibration cycle and allows the processor 18 to make adjustments, also using the programming signals 50, to components in the transceiver to minimize or compensate for problems, such as I/Q mismatches, baseband filter cutoff frequency mismatch, DC offset, etc.

The programming signals 50 can control the calibration paths needed for DC offset calibration, filter tuning, I/Q mismatch calibration, and LO leakage calibration, and can also be used for tuning of the frequency synthesizer 34. For example, processor 18 preferably has the capability of real-time digital pre-distortion and post-distortion in blocks 44 and 40, respectively, which is needed for compensation of transmitter and receiver I/Q mismatch and transmitter local oscillator (LO) leakage. These aspects of the present invention are described in greater detail below. On a different embodiment of the overall system, the functionality of the digital predistortion and digital post-distortion blocks 40 and 44 can be achieved by using the analog pre-distortion block 110, together with DACs 120 and 124 and the analog post-distortion block 160 respectively.

Baseband processor 18 can be implemented in a variety of different embodiments. The functions of processor 18 shown in FIG. 1 are common in many types of microprocessors and other types of processors, or can exist in specialized processors (e.g., ASICs), such as for wireless LAN applications in such an embodiment.

Calibration methods 20 calibrate the transceiver 16 as described herein by measuring characteristics of transceiver components based on received calibration signals by and computing the necessary correction parameters for the calibration of the transceiver 16 to correct any analog imperfections in the circuits. These methods can be implemented by the processor 18 in some embodiments (such as by DSP 42), for example as program instructions or code (software or firmware) stored in memory or other storage device (magnetic disk, CD-ROM, etc.), or by hardware (logic gates, etc.), or by a combination of hardware and software. In other embodiments, the calibration methods can be implemented and performed by a general purpose processor, such as the host processor of a computer that includes a network card or component holding the system 20, or by a different processor in communication with the processor 18 or transceiver 16.

U.S. patent Ser. No. 10/654,199 (2629P) entitled "Direct-Conversion Transceiver Enabling Digital Calibration" discloses a transceiver for transmitting and receiving signals includes a transmitter operative to up-convert baseband signals from a baseband frequency into RF signals at a radio frequency (RF) frequency and output the RF signals, a receiver operative to receive RF signals and down-convert the RF signals into baseband signals having the baseband frequency, and a plurality of calibration paths coupling the transmitter to the receiver. Any of the calibration paths can be selected to be active when calibrating components of the transceiver. Tunable components can use calibration information to optimize transceiver performance. In this application different filters are utilized for the transmit and receive paths.

The present invention is an improvement on the above-identified application which can operate in multiple RF bands and uses the same filters for both the transmit and receive paths for the digital calibration in order to correct for nonidealities in the analog front-end of a transceiver to achieve performance adequate to support high bit rate modulation schemes. This is accomplished utilizing switches in the transmit path and the receive path and providing different coefficients to the filters in the different paths through the use of digital to analog converters. Switches are also used to provide the calibration paths. In some embodiments, aspects of the present invention can also be used in non-direct-conversion transceivers, as appropriate. To describe the features of the present invention in more detail, refer now to the following discussion in conjunction with the accompanying figures.

Figure 2:
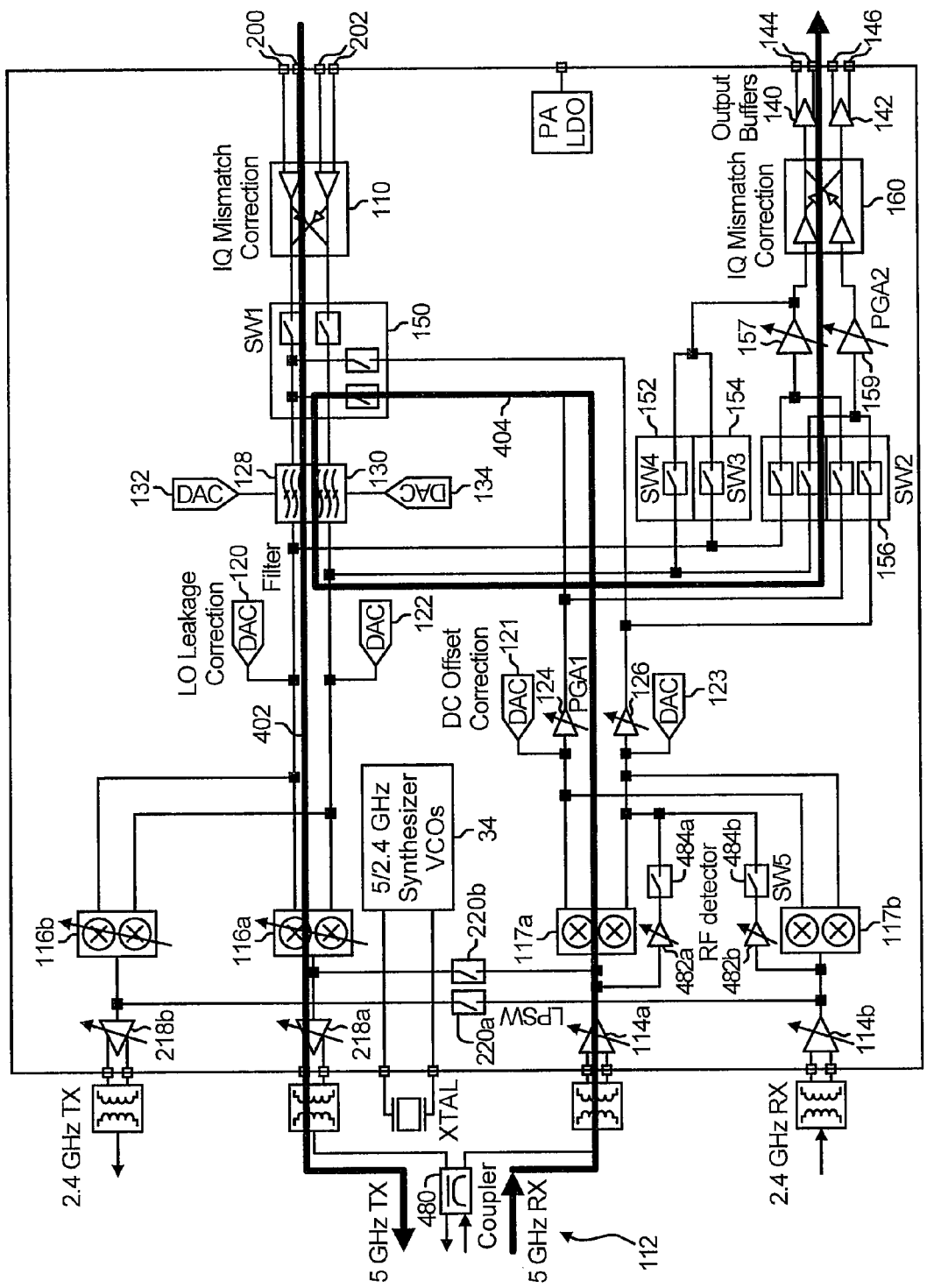
FIG. 2 is a schematic diagram illustrating one embodiment of the transceiver of the present invention.

FIG. 2 is a schematic diagram illustrating one embodiment of the transceiver 16 of the present invention. As described above, transceiver 16 includes a receiver 30, a transmitter 32, and a frequency synthesizer 34. Both transmitter and receiver components preferably use direct conversion and employ fully differential signal paths to minimize crosstalk and externally induced noise.

In this embodiment, a dual band transceiver is described. Therefore there are 2 separate RF paths for both transmit and receive, which merge into common baseband paths. The 2 RF paths in this embodiment are a 5 GHz and a 2.4 GHz path but any two different bands could be implemented. For purposes of this application the 5 GHz paths will be discussed but it should be understood that the same principles apply to the 2.4 GHz paths.

Receiver

The receiver 30 includes a receiver input 112, which provides a signal received by the transceiver 16 from the antenna 12. The signal is preferably in differential form to reduce second order distortion and minimize substrate and supply coupling, such that positive (P) and negative (N) terminals are used; however, signals in other forms can be used with the present invention in alternate embodiments.

The received signal is sent from the input 112 to a low noise amplifier (LNA) 114a, which amplifies the received signal. The LNA 114a has sufficient gain to provide a signal having a high enough amplitude for use in the receiver while introducing little noise to the signal.

The amplified signal from LNA 114a is provided to a quadrature demodulator 117a, which downconverts the high frequency signal directly into the baseband frequency. The quadrature demodulator 117a includes two mixers. The quadrature demodulator 117a receives a reference (LO) signal at a desired frequency from a frequency synthesizer 34. The demodulator 117a separates the received passband signal into two baseband differential signals, one In-phase (I) and one Quadrature (Q).

The quadrature demodulator 117a can introduce DC offset to the signal, which is corrected in the preferred embodiment by a DC offset correction circuit and calibration, as described in greater detail below. Large DC offset can corrupt a weak signal or saturate the baseband circuits, programmable gain amplifiers (PGAs) 124 and 126, filters 128 and 130, etc. The overall receive chain path DC offset is calculated in the calibration cycles and in subsequent DC offset tracking cycles and is real-time corrected (adaptively cancelled) at the output of the mixers of the quadrature demodulator 117a by two independent 8-bit current steering digital-to-analog converters (DACs) 121 and 123. DAC 121 corrects the DC offset on the I path of the demodulator 117a, and DAC 123 corrects the DC offset on the Q path of the demodulator 117a, by adding a small DC voltage (relative to the DC voltage level) to the signal at the output of the demodulator 117a and input to the PGA 124 or 126.

The baseband path of the receiver includes components of amplifiers, filters, and output buffers on the I and Q paths. The baseband path can include different components in other embodiments; a direct-conversion baseband path, in general, performs filtering and variable gain.

Digitally programmable gain amplifiers (PGAs) 124 and 126 receive the outputs of the demodulator 117a on the I and Q paths, respectively. PGA 124 can employ, for example, a low-noise, high dynamic range single-stage amplifier with a resistive attenuator at its input, but can be other types of programmable amplifiers in alternate embodiments. The gain of the PGA 124 and 126 is programmable by a digital word provided by the baseband processor 18, e.g., via the AGC programming bus 50. Other embodiments can also be used, such as variable gain amplifiers (VGAs) controlled by an analog voltage.

Low pass filters 128 and 130 receive the output of the corresponding PGA 124 or 126 on the I and Q paths, respectively, and perform baseband channel selection. In one embodiment, a fourth order Chebyschev filter can be used for each filter 128 and 130; however, any filter can be used which can be tuned by a voltage or by a digital word. The response of each filter 128 and 130 can be tuned to a desirable cutoff frequency and bandwidth by the DC voltage Vc generated by DACs 132 and 134, respectively. The DACs are controlled by signals from the processor 18 to enable the receive filters to be tightly matched in their responses with each other.

A key feature of the present invention is that the filters 128 and 130 are used in both the receive and transmit paths. In the receive path switch 150 steers the I, Q outputs of PGAs 124 and 126 into the common filters 128 and 130 and switches 156 connects the output of the filters to PGAs 157, 159.

After the PGAs 157 and 159, the signal flows to the I/Q mismatch correction unit 160 which is the analog equivalent of FIG. 1a and can be also programmed to be inactive, i.e., to not have effect on the signal. The signal is then provided to the output buffers 140 and 142.

The output buffer 140 and 142 is employed at each of the I and Q paths, respectively. The outputs of the buffers 140 and 142 are provided at receiver outputs 144 and 146 of the transceiver 16, where each path provides a differential signal having positive and negative components. The signals from these receiver outputs are provided to processor 18 as explained above with respect to FIG. 1.

In receive mode, only the circuit blocks that are in the above described signal path are turned on (meaning they are active), together with the frequency synthesizer 34 and the appropriate bias circuits (not shown). The other cells are turned off.

Transmitter

The transmitter 32 of transceiver 16 is a direct conversion, up-conversion transmit path and includes transmitter inputs 200 and 202. The inputs 200 and 202 receive a signal from the baseband processor 18 which has formulated the analog signal that is to be upconverted and transmitted by the transceiver 16. For example, in the described embodiment, the transmit path input analog signal is provided by DACs 46a and 46b located at the processor 18, as described above with respect to FIG. 1. The signal is preferably in the form of I and Q signals, where input 200 receives the I signal, and input 202 receives the Q signal. Furthermore, each I and Q signal path is preferably provided in differential form, such that positive (P) and negative (N) terminals are used by each.

The I and Q signals to be transmitted are sent from the inputs 200 and 202 to I/O mismatch corrective unit 110, which is functionally equivalent to FIG. 1*b*. From the unit 110 switch 150 provides the signal to filters 128 and 130. As before mentioned, the same filters are used in both the transmit and receive paths. These filters are tuned to the desirable cutoff frequency and bandwidth by the DC voltage Vc generated by 8-bit DACs 132 and 134, respectively. In other embodiments, variable gain stages can be included before, after, or merged with the filter. In other embodiments, different resolution can by used in the DACs or direct digital or analog control can be applied to filters to control its characteristics The filters 128 and 130 can have a different cutoff frequency and bandwidth in transmit mode than in receive mode. This is achieved by using a different digital signal controlling the DACs 132 and 134 during transmit mode than during receive mode.

The outputs of the filters 128 and 130 provide the filtered I and Q signals to a programmable gain modulator (PGM) 116*a*. In this mode switches 152, 154 and 156 are turned off. In other embodiments the modulator 116*a* can be fixed gain. The PGM 116*a* up-converts the I and Q pathways to a single transmit path at the desired RF carrier frequency, i.e., the mixer modulates the baseband signals directly into the high frequency signal. The PGM 116*a* receives a reference (LO) signal at a desired frequency from frequency synthesizer 34.

The output of the I and Q mixers in the PGM 116*a* is summed in order to drive the RF output amplifier. Gain programmability of the PGM 116*a* is achieved by adjusting the input transconductance stage using a switchable resistive ladder at the input of the mixers. In one example embodiment, the modulator 216*a* provides 27 dB of gain control in 3 dB steps.

The output of the PGM 116*a* is preferably a fully differential signal path, but in alternate embodiments can take other forms. The differential output of the PGM 116*a* is amplified by an RF output driver amplifier 218*a*, also preferably differential. In the described embodiment, the driver amplifier 218*a* can be a single stage cascoded differential pair, inductively degenerated to improve linearity. In other embodiments, amplifier 218*a* can have variable programmable gain.

In transmit mode, only the circuit blocks that are in the above described signal path are turned on, together with the frequency synthesizer 34 and the appropriate bias circuits (not shown). The other cells are turned off.

Calibration Switches and Interface

A number of calibration "loop-back" switches are provided in the transceiver 16 to allow the calibration of the present invention to be performed. The calibration, or parts thereof, occurs upon power-up of the system 10, and also may occur during operation. The switches allow desired feedback or loopback paths of the transceiver 16 to be selected to be active so that calibration can occur.

Figure 3:
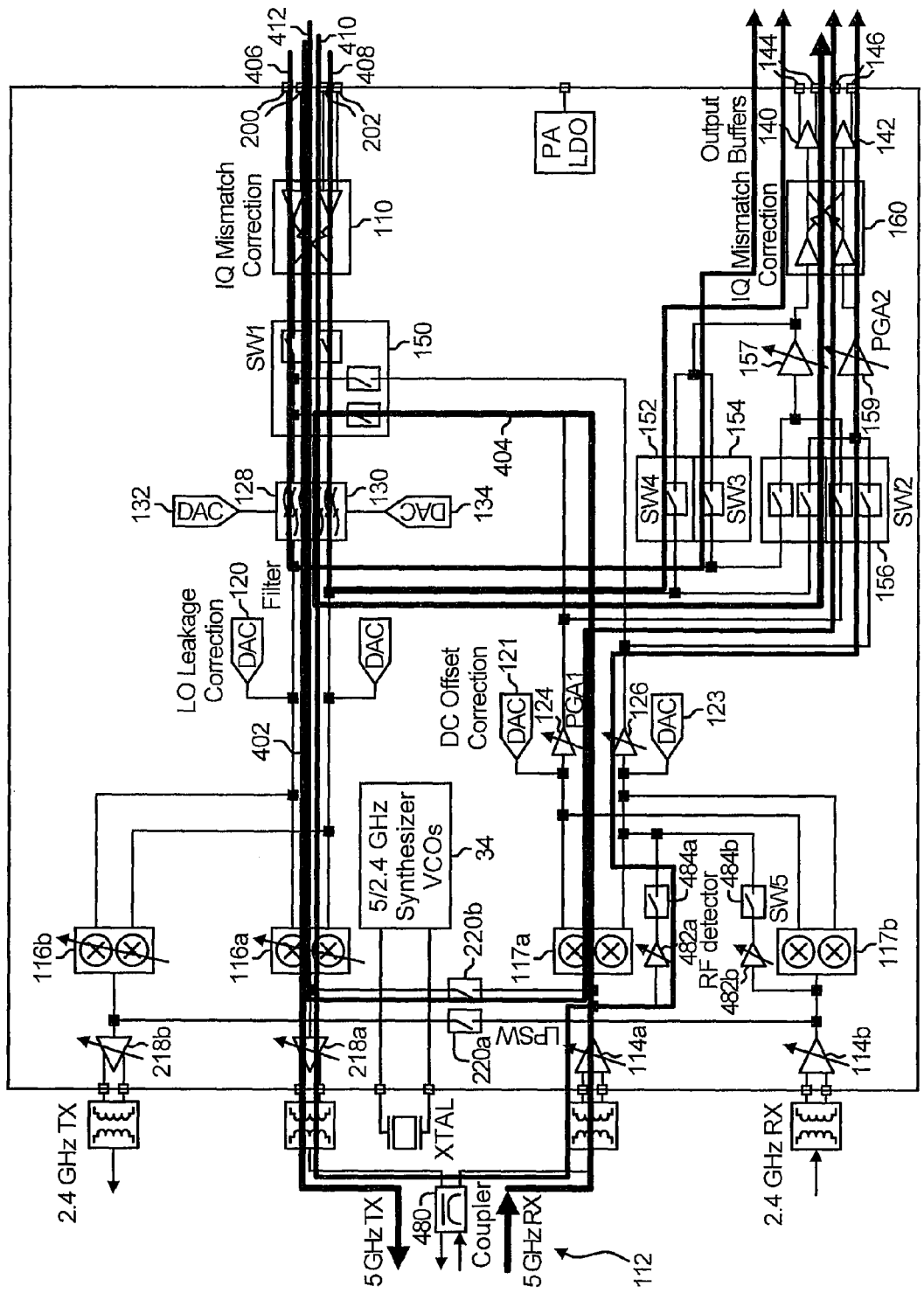
FIG. 3 is a diagram of the transceiver 16 which shows the different calibration paths.

FIG. 3 is a diagram of the transceiver 16 which shows the calibration paths.

I-Filter Path 406

The signal is fed from the TX-I input 200, via IQ mismatch correction block 110 which is inactive in this case to the I-filter 128 input with appropriate configuration of switch 150. The I-filter output via appropriate configuration of switch 154 and IQ correction block 160 (inactive again) to RX I output buffer 140 and to RX I output 144. With appropriate selection for the TX I signal and appropriate processing of RX I received via this path, the filter characteristic is measured by the baseband processor 18 after being digitized by its ADC 38*a* (FIG. 1). The measurement and adjustment can be done by the calibration algorithm 20 which is typically implemented in software. Using an iterative procedure, the filter 128 characteristic is adjusted to desired by DAC 132. Only the blocks active in the signal path are active; others are powered down.

Q-Filter Path 408

The signal is fed from the TX-Q input 202, via IQ mismatch correction block 110 which is inactive in this case to the Q filter 130 input with appropriate configuration of switch 150. Q filter output via appropriate configuration of switch 152 and IQ correction block 160 (inactive again) to RX I output buffer 140 and to RX I output 144. With appropriate selection for the TX Q signal and appropriate processing of RX I received signal via this path, the filter characteristic is measured by baseband processor 18 after being digitized by its ADC 38*a* (FIG. 1). The measurement and adjustment can be done by the calibration algorithm 20 which is typically implemented in software. Using an iterative procedure, the characteristic is adjusted to desired by DAC 134. Only the blocks active in the signal path are active, others are powered down.

By using the above 2 calibration paths the two filters 128, 130 can be programmed to match very accurately.

5 GHz TX IQ Mismatch Calibration Path 410

The test signal from TX I and TX Q inputs 200 and 202, via switch 150 is fed to baseband filters 128/130 I/Q inputs, to PGM 116*a* inputs, to PGM 116*a* output, to PA driver 218*a*, coupled by RF coupler 480 (small portion of signal) to 5 GHz LNA 114*a* input, to 5 GHz RF detector 482*a* input, to Q-PGA 126 (I PGA 124 could also be used) input via switch 484*a*, to Q-PGA 159 (or I PGA 157) input via switch 156, to Rx Q output 146 (or I output 144) via inactive IQ correction block 160 and Q buffer 142 (or I buffer 140). With appropriate selection for TX I/Q signals and appropriate processing of RX Q (or RX I) received signal via this path, TX Q mismatch and LO leakage is estimated and during normal transmit operation (chip in "transmit" mode) removed using the digital pre-distortion block in FIG. 1*b* or analog pre-distortion block 110 together with DACs 120 and 122 which perform overall the same function as FIG. 1*b* but in the analog domain. Only the blocks active in the signal path are active together with synthesizer and oscillator, others are powered down. In the above description, an RF detector 482*a* produces the envelope of an RF modulated signal. A coupler 480, sends most of the signal to its main output and a small portion of the signal to its coupling output, which in FIG. 3 is the input of the transformer (or balun) that feeds the differential input of LNA 114*a*.

2.4 GHz TX IQ Calibration Path

The TX IQ calibration path for 2.4 GHz is the same as for the 5 GHz path but replacing the appropriate RF blocks.

5 GHz RX IQ Mismatch Calibration Path 412

The test signal from TX I and TX Q inputs 200 and 202, via switch 150 to filters 128 and 130 I/Q inputs, to programmable gain modulator (PGM) 116*a* inputs, to PGM 116*a* output, to quadrature demodulator 117*a* via switch 220*a*, to PGA 124 and 126 I/Q inputs, to PGA 157 and 159 I/Q inputs via appropriate setting of switch 156, to inactive IQ mismatch correction block 160, to RX I/Q outputs 144, 146 via I/Q output buffers 140, 142. With appropriate selection for TX I/Q signals and appropriate processing of RX I/Q received signals via this path, RX IQ mismatch is estimated and removed during normal receive operation using the digital post-distortion block in FIG. 1*a* or block 160 which perform essentially the same function as FIG. 1*a* but in the analog domain. Only the blocks active in the signal path are active together with synthesizer and oscillator, others are powered down.

2.4 GHz RX IQ Mismatch Calibration Path

The RX IQ calibration path for 2.4 GHz is the same as for the 5.6 GHz path but replacing the appropriate RF blocks.

A digital interface (not shown) provides the interface to the transceiver 16 to allow the control/programming signals from the processor 18 to power up or down different sections of the transceiver, e.g., to make sure that, in various calibration modes, different sections of the transceiver are powered up and down (the components/sections powered up are generally those where the signal passes through or necessary for signal passage). The interface also allows the signals from processor 18 to operate calibration control circuitry on the transceiver, such as the DACs, and the control switches (described above) to create the necessary loopback paths for calibration. The digital interface 48 can send commands that are decoded in the transceiver (by logic, etc.) which sends the appropriate control signals or digital words to the switches, DACs, etc., and to power up and down different sections.

The architecture in accordance with the present invention optimizes the fundamental analog performance, such as noise and distortion, by keeping the architecture simple. The limited number of analog blocks in the signal path contributes to excellent performance and yield at limited power consumption. The approach chosen to eliminate common shortcomings of CMOS and direct conversion architecture was to add loop-back paths so that the companion digital chip can be used for calibration. By using the computational resources of the companion digital chip, analog calibration loops are avoided which contributes to a more robust design. The architecture is thus kept simple since no additional analog circuitry for DC offset correction, filter calibration or IQ mismatch correction is required.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A communication device, comprising:
one or more circuits in an integrated transmitter and receiver comprising a transmit path and a receive path, wherein said transmit path comprises an I processing baseband transmit path and a Q processing baseband transmit path, and said receive path comprises an I processing baseband receive path and a Q processing baseband receive path, said one or more circuits enable:
sharing a first common filter by said I processing baseband transmit path and said I processing baseband receive path; and
sharing a second common filter by said Q processing baseband transmit path and said Q processing baseband receive path, wherein said first common filter and said second common filter are independently programmable to adjust a phase and/or a gain of said first common filter, and/or a phase and/or a gain of said second common filter.

2. The communication device according to claim 1, wherein said integrated transmitter and receiver comprises:
a first RF path for handling a first band of RF frequency signals; and
a second RF signal path for handling a second band of RF frequency signals.

3. The communication device according to claim 2, wherein said first RF band of RF frequency signals comprises a 2.4 GHz band, and said second RF band of RF frequency signals comprises a 5 GHz band.

4. The communication device according to claim 1, wherein said one or more circuits are operable to measure said phase and/or gain of said first common filter and said second common filter within one or both of said I and/or Q processing baseband transmit path and said I and/or Q processing baseband receive path via a loopback connection during a calibration cycle.

5. The communication device according to claim 4, wherein said one or more circuits are operable to independently tune said first common filter and/or said second common filter based on said measurement.

6. The communication device according to claim 5, wherein said independent tuning is done by one or both of Digital-to-Analog Converters (DACs) and/or direct digital or analog programming.

7. The communication device according to claim 4, wherein said one or more circuits are operable to mitigate or remove residual mismatch between said first common filter and said second common filter by digital pre-processing during said calibration cycle.

8. The communication device according to claim 4, wherein said one or more circuits are operable to configure one or more analog switches to enable said sharing of said first common filter and said sharing of said second common filter during said calibration cycle.

9. The communication device according to claim 4, wherein said one or more circuits are operable to program said first common filter and said second common filter to have different cutoffs in a transmit mode and a receive mode during said calibration cycle.

10. The communication device according to claim 4, wherein said one or more circuits are operable to configure a loopback connection from a transmit RF node of said Q processing baseband transmit path or any RF output of an external amplifier.

11. The communication device according to claim 10, wherein said one or more circuits are operable to estimate local oscillator (LO) leakage via said loopback connection during said calibration cycle.

12. The communication device according to claim 10, wherein said one or more circuits are operable to measure transmit I/Q mismatch via said loopback connection.

13. The communication device according to claim 12, wherein said one or more circuits are operable to measure said transmit I/Q mismatch via an envelope detector.

14. The communication device according to claim 10, wherein said one or more circuits are operable to mitigate I/Q mismatch and/or remove LO leakage via digital processing during said calibration cycle.

15. The communication device according to claim 10, wherein said one or more circuits are operable to mitigate and/or remove I/Q mismatch and/or LO leakage in the analog domain during said calibration cycle.

16. The communication device according to claim 1, wherein said one or more circuits are operable to measure I and/or Q processing baseband receive path I/Q mismatch after mitigating or removing transmit I/Q mismatch.

17. The communication device according to claim 16, wherein said one or more circuits are operable to remove said I and/or Q processing baseband receive path I/Q mismatch in the analog domain.

18. The communication device according to claim 16, wherein said one or more circuits are operable to configure a loopback connection during a calibration cycle to measure said I and/or Q processing baseband receiver path I/Q mismatch.

19. A method of communication, the method comprising:
in an integrated transmitter and receiver comprising a transmit path and a receive path, wherein said transmit path comprises an I processing baseband transmit path and a Q processing baseband transmit path, and said receive path comprises an I processing baseband receive path and a Q processing baseband receive path:
sharing a first common filter by said I processing baseband transmit path and said I processing baseband receive path; and
sharing a second common filter by said Q processing baseband transmit path and said Q processing baseband receive path, wherein said first common filter and said second common filter are independently programmable to adjust a phase and/or a gain of said first common filter, and/or a phase and/or a gain of said second common filter.

20. The method according to claim 19, wherein said integrated transmitter and receiver comprises:
a first RF path for handling a first band of RF frequency signals; and
a second RF signal path for handling a second band of RF frequency signals.

21. The method according to claim 20, wherein said first RF band of RF frequency signals comprises a 2.4 GHz band, and said second RF band of RF frequency signals comprises a 5 GHz band.

22. The method according to claim 19, comprising measuring said phase and/or said gain of said first common filter and said second common filter within one or both of said I and/or Q processing baseband transmit path and/or said I and/or Q processing baseband receive path via a loopback connection during a calibration cycle.

23. The method according to claim 22, comprising independently tuning said first common filter and/or said second common filter based on said measurements.

24. The method according to claim 23, wherein said independent tuning is done by one or both of Digital-to-Analog Converters (DACs) and/or direct digital or analog programming.

25. The method according to claim 22, comprising mitigating or removing residual mismatch between said first common filter and said second common filter by digital pre-processing during said calibration cycle.

26. The method according to claim 22, comprising configuring one or more analog switches to enable said sharing of said first common filter and said sharing of said second common filter during said calibration cycle.

27. The method according to claim 22, comprising programming said first common filter and said second common filter to have different cutoffs in a transmit mode and a receive mode during said calibration cycle.

28. The method according to claim 22, comprising configuring a loopback connection from a transmit RF node of said Q processing baseband transmit path or any RF output of an external amplifier.

29. The method according to claim 28, comprising estimating local oscillator (LO) leakage via said loopback connection during said calibration cycle.

30. The method according to claim 28, comprising measuring transmit I/Q mismatch via said loopback connection.

31. The method according to claim 30, comprising measuring said transmit I/Q mismatch via an envelope detector.

32. The method according to claim 28, comprising mitigating I/Q mismatch and/or removing LO leakage via digital processing during said calibration cycle.

33. The method according to claim 28, comprising mitigating and/or removing I/Q mismatch and/or LO leakage in the analog domain during said calibration cycle.

34. The method according to claim 19, comprising measuring I and/or Q processing baseband receive path I/Q mismatch after mitigating or removing transmit I/Q mismatch.

35. The method according to claim 34, comprising removing said I and/or Q processing baseband receive path I/Q mismatch in the analog domain.

36. The method according to claim 34, comprising configuring a loopback connection during a calibration cycle to measure said I and/or Q processing baseband receiver path I/Q mismatch.

* * * * *